United States Patent
Anders et al.

(10) Patent No.: US 6,805,904 B2
(45) Date of Patent: Oct. 19, 2004

(54) PROCESS OF FORMING A MULTILAYER NANOPARTICLE-CONTAINING THIN FILM SELF-ASSEMBLY

(75) Inventors: Simone Anders, Cupertino, CA (US); Shouheng Sun, Millwood, NY (US)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 10/080,195

(22) Filed: Feb. 20, 2002

(65) Prior Publication Data

US 2003/0157325 A1 Aug. 21, 2003

(51) Int. Cl.$^7$ .............................. B05D 1/38; B05D 3/02; B05D 3/10; B05D 7/24
(52) U.S. Cl. ...................... 427/203; 427/240; 427/333; 427/372.2; 427/430.1
(58) Field of Search ................................ 427/180, 201, 427/202, 203, 205, 240, 301, 333, 372.2, 402, 419.1, 430.1

(56) References Cited

U.S. PATENT DOCUMENTS

| | | | |
|---|---|---|---|
| 4,087,582 A | 5/1978 | Shirahata et al. | |
| 4,305,993 A | 12/1981 | Zaitsu et al. | |
| 4,539,061 A | 9/1985 | Sagiv | |
| 4,540,618 A | 9/1985 | Suzuki et al. | |
| 4,844,991 A | 7/1989 | Miura et al. | |
| 5,208,111 A | 5/1993 | Decher et al. | |
| 5,338,571 A | 8/1994 | Mirkin et al. | |
| 5,409,739 A | 4/1995 | Liu | |
| 5,518,767 A | 5/1996 | Rubner et al. | |
| 5,536,573 A | 7/1996 | Rubner et al. | |
| 5,609,907 A | * 3/1997 | Natan ........................ 427/2.12 | |
| 5,686,549 A | 11/1997 | Grainger et al. | |
| 5,716,709 A | 2/1998 | Ferguson et al. | |
| 5,807,636 A | 9/1998 | Sheu et al. | |
| 5,837,377 A | 11/1998 | Sheu et al. | |
| 5,885,753 A | 3/1999 | Crooks et al. | |
| 6,022,590 A | 2/2000 | Ferguson et al. | |
| 6,057,035 A | 5/2000 | Singh et al. | |
| 6,107,084 A | 8/2000 | Onda et al. | |
| 6,114,099 A | 9/2000 | Liu et al. | |
| 6,162,532 A | * 12/2000 | Black et al. ................. 428/323 |
| 6,221,673 B1 | * 4/2001 | Snow et al. ................. 436/149 |
| 6,254,662 B1 | 7/2001 | Murray et al. | |
| 6,262,129 B1 | 7/2001 | Murray et al. | |
| 6,265,021 B1 | 7/2001 | Black et al. | |
| 6,270,946 B1 | * 8/2001 | Miller ........................ 430/296 |

OTHER PUBLICATIONS

Chen et al., "Gold Nanoparticle Assemblies by Metal Ion—Pyridine Complexation and Their Rectified Quantized Charging in Aqueous Solutions," J. Phys. Chem. B 2002, 106, 1903–1908, Received: Sep. 19, 2001, Final: Dec. 17, 2001, Published on Web: Jan. 31, 2002.*

"Semiconductor Clusters, Nanocrystals, and Quantum Dots" By A.P. Alivisatos, Science Magazine, vol. 271, Feb. 16, 1996, pp. 933–937.

(List continued on next page.)

Primary Examiner—Shrive P. Beck
Assistant Examiner—William Phillip Fletcher, III
(74) Attorney, Agent, or Firm—McGinn & Gibb, PLLC; Wan Yee Cheung, Esq.

(57) ABSTRACT

A method and structure that forms a multilayer nanoparticle thin film assembly begins by functionalizing a substrate with functional molecules. Next, the invention replaces a stabilizer on a bottom surface of the first nanoparticles with the functional molecules via surface ligand exchange to make a first nanoparticle layer on the substrate. The invention then replaces the stabilizer on a top surface of the first nanoparticle layer with functional molecules via surface ligand exchange. The invention replaces the stabilizer on a bottom surface of the second nanoparticles with the functional molecules via surface ligand exchange to make a second nanoparticle layer on the first nanoparticle layer. Lastly, the invention repeats the previous steps and forms additional nanoparticle layers.

24 Claims, 7 Drawing Sheets

OTHER PUBLICATIONS

"A single–electron transistor made from a cadmium selenide nanocrystal" by David L. Klein, Richard Roth, Andrew K.L. Lim, A. Paul Alivisatos & Paul L. McEuen, Mac Millan Publishers Ltd., 1997,Nature Magazine, vol. 389, Oct. 16, 1997, pp. 699–701.

"Coulomb Staircase at Room Temperature in a Self–Assembled Molecular Nanostructure" by Ronald P. Andres, Thomas Bein, Matt Dorogl, Sue Feng, Jason I. Henderson, Clifford P. Kubiak, William Mahoney, Richard G. Osifchin, R. Reifenberger, Science Magazine, vol. 272, May 31, 1996, pp. 1323–1325.

"Self–Assembling Magnetic Nanomaterials" by S. Sun and D. Weller, J. Magazine Society Japan, vol. 25, No. 8, 2001, pp. 1433–1440.

"Monodisperse FePt Nanoparticles and Ferromagnetic FePt Nanocrystal Superlattices" by Shouheng Sun, C.B. Murray, Dieter Weller, Liesl Folks, and Andreas Moser, Science Magazine, vol. 287, Mar. 17, 2000, pp. 1989–1992.

"Fabrication of the Multilayered Nanostructure of Alternating Polymers and Gold Nanoparticles with Thin Films of Self–Assembling Diblock Copolymers" by B.H. Sohn and B.H. Seo, American Chemical Society, Chemical Materials Magazine, 2001, vol. 13, pp. 1752–1757.

"Layer–by–Layer Self–Assembly of Polyelectrolyte and Low Molecular Weight Species into Capsules" by Zhifei Dai, Andreas Voigt, Stefano Leporatti, Edwin Donath, Lars Dahne, and Helmuth Mohwald, Advanced Materials, 2001, vol. 13, No. 17, Sep. 3, pp. 1339–1342.

"Preparation and Optical Properties of Colloidal Gold Monolayer" J. Schmitt, P. Machtle, D. Eck, H. Mohwald, and C.A. Helm, 1999 American Chemical Society, Langmuir 1999, vol. 15, pp. 3256–3266.

"Layer–by–Layer Assembly of Thin Film Zener Diodes from Conducting Polymers and CdSe Nanoparticles" by Thierry Cassagneau, Thomas E. Mallouk, and Janos H. Fedler, J. American Chemiscal Society, 1998, vol. 120, pp. 7848–7859.

"Molecular Self–Assembly of TiO2/ Polymer Nanocomposite Film" by Yanjing Liu, Anbo Wang, and Richard Claus, 1997 American Chemical Society, J. Physicians Chemistry, B 1997, vol. 101, pp. 1385–1388.

"DNA Components for Molecular Architecture" by Nadrin C. Seeman, Dept. of Chemistry, New York University, Rec'd Feb. 19, 1997 American Chemical Society, vol. 30, No. 9, 1997/Accounts of Chemical Research, pp. 357–363.

"Buildup of Polymer/Au Nanoparticle Multilayer Thin Films Based on Hydrogen Bonding" by Encai Hao and Tianquan Lian, 2000American Chemical Society, Chemical Materials, 2000, vol. 12, pp. 3392–3396.

"Self Organized Discotic Liquid Crystals for High–Efficiency Organic Photovoltais" by L. Schmidt–Mende, A. Fechtenkotter, K. Mullen, E. Moons, R.H. Friend, J.D. MacKenzie, Science Magazine, vol. 293, Aug. 10, 2001, pp. 1119–1122.

"Self–Assembled Nanocomposite Polymer Light–Emitting Diodes with Improved Efficiency and Luminance" by Valery Bliznyuk, Beat Rubstaller, Phil J. Brock, Ulli Scherf, and Sue A. Carter, Advanced Materials, 1999, 11, No. 15, pp. 1257–1261.

"Three–Dimensional Arrays in Polymer Nanocomposites" by Eugenia Kumacheva, Olga Kalinina, and Lothar Lilge, Advanced Materials, 1999, 11, No. 3, pp. 231–234.

"Self–Assembled Monolayers of Alkyltrichlorosilanes: Building Blocks For Future Organic Materials" by Abraham Ulman, Advanced Materials 2 (1990) No. 12, pp. 573–582.

"Supramolecular Materials: Self–Organized Nanostructure" by S.I. Stupp, V. LeBonheur, K. Walker, L.S. Li, K.E. Huggins, M. Keser, A. Amstutz, Science Magazine, vol. 276, Apr. 18, 1997, pp. 384–389.

"Metal Films Prepared by Stepwise Assemly. 2. Construction and Characterization of Colloidal Au and Ag Multilayers", by Michael D. Musick, Christine D. Keating, L. Andrew Lyon, Steven L. Botsko, David J. Pena, William D. Holliway, Todd M. McEvoy, John N. Richardson, and Michael J. Natan, 2000 American Chemical Society, Chemical Materials, 2000, vol. 12, pp. 2869–2881.

* cited by examiner

MN = MOLECULE LAYER
NPL = NANOPARTICLE LAYER

READ BACK SIGNAL

PROCESS OF FORMING A MULTILAYER NANOPARTICLE-CONTAINING THIN FILM SELF-ASSEMBLY

BACKGROUND OF THE INVENTION

1. Field of the Invention

The present invention relates to layer-by-layer assembly of nanoparticles, particularly magnetic nanoparticles, into smooth, thin nanoparticles-containing films on a variety of sized and shaped substrates.

2. Description of the Related Art

Self-assembly of functional objects with controlled structure and lateral dimensions is of fundamental and technological interest. Self-assembly is a naturally-occurring process, an evident example being biological molecules, which self-organize into various living structures. The molecules will combine in various manners in this self-assembly process via weak van der Waals interactions, hydrogen bond interactions, or strong ionic and covalent bond interactions. The idea of this molecule-based, self-assembly approach has been applied to the fabrication of artificial structures with controlled functionality. A variety of patented processes based on ionic absorptions to form polymeric/organic films, organic/inorganic hybrid films, and chemical interactions to form polymeric/organic films, or organic/inorganic hybrid films have been issued.

Nanoparticles contain hundreds to thousands of single molecules or atoms and have long been recognized as having enhanced chemical and physical properties compared to their bulk forms. It was recently realized that these nanoparticles with uniformity in size, shape and internal structure could be used as unique building blocks to fabricate nanoparticles-based functional structures. Generally, this nanoparticles-based self-assembly is governed by the nature of the interactions exhibited among the stabilized particles. Various monodisperse nanoparticle materials, including polymers, semiconductors, and metals, have been tested for use in building self-assembly nanoscale devices.

Advances in magnetic recording technology have driven the development of new magnetic nanoparticle-based media/devices and have increased the need for uniformity in both particle size and particle magnetics. Self-assembly of magnetic nanoparticles may offer a suitable approach to such media. In these nanoparticulate films, grains (nanoparticles) are uniform and encapsulated in a non-magnetic coating which minimizes exchange coupling between adjacent grains. Such a new paradigm may present a magnetic recording medium, possibly supporting areal storage densities beyond Terabits per square inch. Until now, the chemical processes to control the assembly thickness and lateral dimension are mainly applied to non-magnetic nanoparticles. Controlled chemical assemblies of magnetic nanoparticles for magnetic recording applications are rare, and most of those processes focus on tape applications.

The present invention focuses on a process to assemble monodisperse nanoparticles on functionalized substrates and the structure resulting therefrom.

SUMMARY OF THE INVENTION

In view of the foregoing and other problems, disadvantages, and drawbacks of conventional magnetic storage devices, the present invention has been devised, and it is an object of the present invention, to provide a structure and method for a process that forms a multilayer nanoparticle thin film assembly. The process begins by functionalizing a substrate with functional molecules. Next, the invention replaces a stabilizer on a bottom surface of the first nanoparticles with the functional molecules via surface ligand exchange to make a first nanoparticle layer on the substrate. The invention then replaces the stabilizer on a top surface of the first nanoparticle layer with functional molecules via surface ligand exchange. The invention replaces the stabilizer on a bottom surface of the second nanoparticles with the functional molecules via surface ligand exchange to make a second nanoparticle layer on the first nanoparticle layer. Lastly, the invention repeats the previous steps and forms additional nanoparticle layers. The substrate can include either glass, quartz, ceramics, silicon, silicon oxide, or carbon. The functionalization of the substrate can include coating a layer of the functional molecules on the substrate by dipping the substrate into the molecule solution; or, it can include spin coating a layer of the functional molecules on the substrate. The functional molecules can either include monomeric or polymeric molecules; or it can include COOR, $CONR_2$, $NH_2$, SH, OH; or at least two functional groups represented as in $H_2N$—R—$NH_2$. The R comprises a common organic or inorganic chain. The stabilizer can be either $H_2O$, $RCOOR_1$, $RCONR_1$, $RNH_2$, RSH, RCN, ROH, or $R_4N+$, where R and $R_1$ represent common organic chains. After the functionalizing process, the invention performs a particle dispersion of aqueous alcoholic, ether, or hydrocarbon solvent. Next, the invention rinses the substrate with solvent and dries the substrate. The first nanoparticles and the second nanoparticles can be the same, or they can be different.

The invention also includes a process which forms a multilayer nanoparticle thin film assembly. First, the invention functionalizes a substrate with functional molecules. Next, the invention replaces a stabilizer on a bottom surface of the first nanoparticles with the functional molecules via surface ligand exchange to make a first nanoparticle layer on the substrate. The invention then replaces the stabilizer on a top surface of the first nanoparticle layer with functional molecules via surface ligand exchange. The invention replaces the stabilizer on a bottom surface of the second nanoparticles with the functional molecules via surface ligand exchange to make a second nanoparticle layer on the first nanoparticle layer. The invention repeats the process to form additional nanoparticle layers and then thermally anneals the multilayer nanoparticle thin film assembly to modify the magnetic and chemical properties of the thin film assembly. The thermally annealing process is performed under an inert atmosphere comprising either nitrogen, argon, or helium. This process is also performed under a reducing atmosphere that includes either hydrogen atmosphere, nitrogen and hydrogen atmosphere, argon and hydrogen atmosphere, or helium and hydrogen atmosphere. The thermally annealing process is also performed under a reactive gas atmosphere. The reactive gas comprises either air, oxygen, hydrocarbon, hydrogen sulfide, halogen or thermally annealing forms, respectively, being one of a granular metal oxide film, a metal carbide film, a metal sulfide film, or a metal haloride film.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Nanoparticles generally exhibit a uniformity in size, shape and internal structure and are, therefore, useful as unique building blocks to fabricate nanoparticle-based functional structures. Self-assembly of nanoparticles offers an easy approach to such structures. Generally, this nanoparticle-based, self-assembly is governed by the nature of the interactions exhibited between the stabilized particles and the substrates. Various monodisperse nanoparticle materials, including polymers, semiconductors, and metals, have been tested in self-assembly processes to build nanoscale devices.

The present invention focuses on a process of assembling nanoparticles, especially magnetic nanoparticles, on a functionalized solid substrate. The process involves "functionalization" of a substrate (coating a substrate with functional molecules); replacement of the stabilizer on the bottom surface of a nanoparticle with functional molecules (via surface ligand exchange) to make one layer of nanoparticle assembly on a substrate; replacement of the stabilizer on the top surface of the nanoparticle with functional molecules (again via surface ligand exchange); and replacement of the stabilizer on the bottom surface of a new nanoparticle with functional molecules (via surface ligand exchange) to make a second layer of nanoparticle assembly on the substrate. The process is repeated to make a multilayered nanoparticle assembly.

To "functionalized" the substrate, the substrate is dipped into a functional organic/polymer solution and then washed and dried. Next, the functionalized substrate is dipped into a nanoparticle dispersion (specifically, a magnetic nanoparticle dispersion) to form the first layer nanoparticle assembly. This process is repeated to form the multilayered nanoparticle assembly.

Thermal annealing is applied to control physical properties of the assembly. This layer-by-layer assembly approach is easily applied to any size and shape substrate, including hard plates of glass, silicon, aluminum (for hard disk) and soft films of plastics (for tape). Therefore, the invention offers a convenient fabrication procedure for nanoparticle assemblies with controlled lateral dimension and thickness.

The invention is based on molecule assisted nanoparticle assembly. Molecules can be monomeric bifunctional molecules (such as $Cl_3Si$—R—X, X—RX, with R being normal organic/inorganic chain and X=$NR_2$, COOR, SH, CN, OH,), polymeric molecules (such as polyvinylpyrrolidone (PVP), polyethyleneimine (PEI), etc., containing multiple $NH_2$, COOR CONR, SH, OH units), and/or bimolecular DNA and protein. The substrate upon which the nanoparticles are formed can be any solid substrate and can have any size or shape. The substrate can be formed of any kind of material, including hard plates, glass, silicon, or aluminum (for hard disk) or soft plates, plastics (for tape), etc.

Functionalized substrates are prepared by absorbing a layer of functional molecules onto the substrates. In these cases, molecular-substrate interactions exist which result in a layer of molecular thin film. The interactions can be any kind from van der Waals, hydrogen bonding to chemical bonding interactions. For example, binding of the trichlorosilane ($Cl_3Si$—R) head groups to the hydrophilic surface is well-known. Hydrolysis of the Si-Cl bonds is caused by traces of water absorbed at the hydrophilic substrate surface. The whole absorption process can be looked at as an in-situ formation of polysiloxane that is connected to surface silanol groups via Si—O—Si bonds. Another example of the interactions includes alkylthiols (RSH) bonding to the gold surface via gold-thiolate (Au—SR) linkages. Polyethyleneimine (PEI) can attach a hydrophilic surface via ionic bonding interactions, while polyvinylpyrrolidone (PVP) molecules can attach to a surface via van der Waals and hydrogen bonding interactions.

The functional molecules are coated onto a substrate by immersing the substrate into the molecule solution. Surface chemical/physical interactions between the molecule and the substrate occur. As the substrate is withdrawn from the solution, a continuous film is generated on the substrate. Extra molecules that adhere to the substrate can be washed away with fresh solvent, leaving a thin molecular layer or thin molecule film that can be used directly for nanoparticle deposition. The functionalized substrate can be thermally treated to facilitate chemical bonding among the molecules and to increase the assembly strength.

Figure 1A:
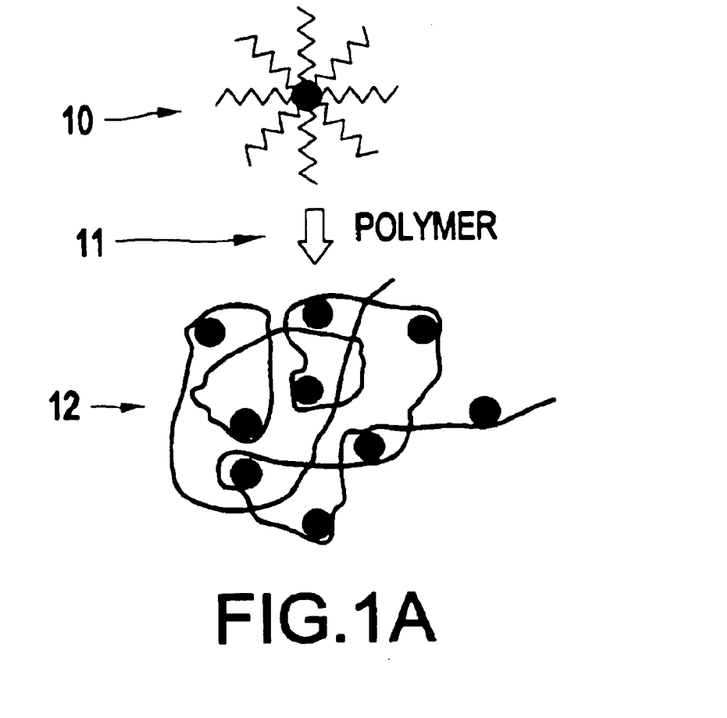
FIG. 1A is a schematic diagram of an example of solution phase liquid exchange.
Figure 1B:
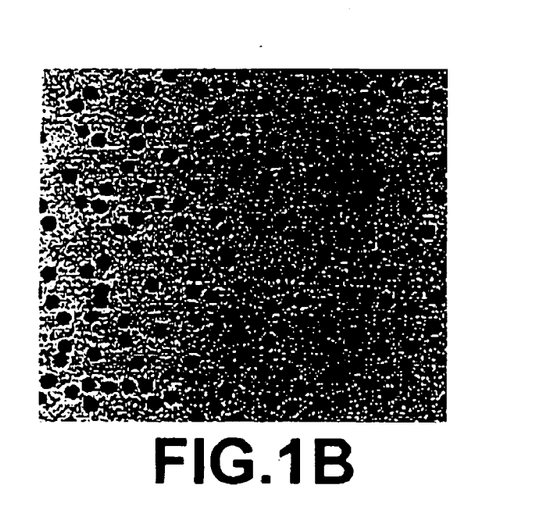
FIG. 1B is an image of polymer-stabilized cobalt nanoparticles.

Forming a molecule-assisted nanoparticle assembly on a solid substrate involves using ligand exchange reactions to exchange the stabilizers bound to the particles with the molecules that selectively bind to the substrate. This ligand exchange reaction is illustrated in FIG. 1A. A polymer 11 (for example Polyvinylpyrrolidone, PVP) replaces a long chain surfactant, such as oleic acid, of the 8 nm cobalt nanoparticles 10 in solution to give polymer stabilized nanoparticle dispersion. As a result, the particle assembly on a solid substrate adopts the polymer-like chain pattern 12. This example demonstrates a solution phase polymer (PVP) molecule replacement of a monomeric molecule (oleic acid) around each cobalt nanoparticle to form PVP stabilized cobalt nanoparticles. FIG. 1B is a TEM image of such polymer-stabilized cobalt nanoparticles that indicates that the particles are buried into the polymer media with good dispersion. Note that the substrate can have any shape, including a plane shape, a sphere, a V-tip, an ellipsoid, a cylinder, etc.

Figure 2A:
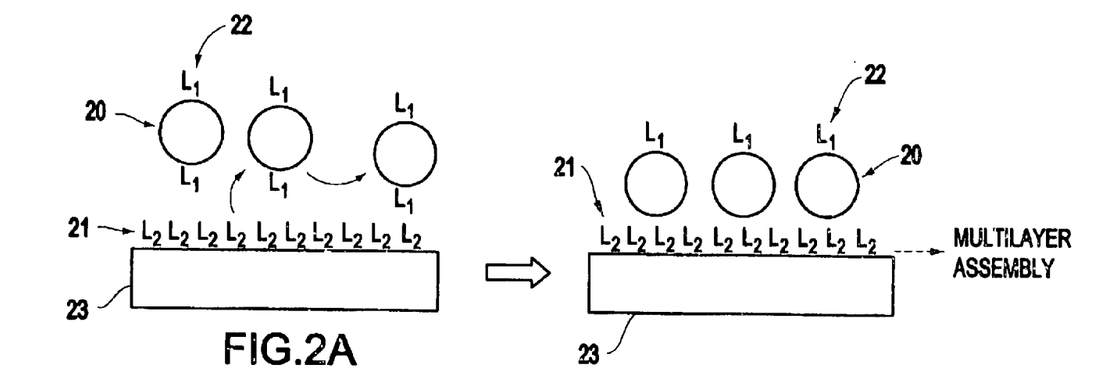
FIGS. 2A and 2B are schematic diagrams showing a nanoparticle assembly formation on a substrate via surface ligand exchange.

The assembly of nanoparticles into a macroscopic two-dimensional array on a functionalized substrate is depicted in FIG. 2A. More specifically, Fig.2A is a schematic diagram showing a nanoparticle assembly formation on a substrate via surface ligand exchange. Item L1 (22) is the stabilizer initially attached to the nanoparticle 20. The stabilizer 22 keeps the nanoparticles from aggregating or oxidizing and, as would be known by one ordinarily skilled in the art, can be any suitable substance. For example, the stabilizer could be $H_2O$, RCOORI RCONR$_1$, RNH$_2$, RSH, RCN, ROH, R$_4$N+, where R and R$_1$ represent common organic chains, etc.

Item L2 (21) is a functional chemical molecule that has strong chemical absorption tendencies to the nanoparticles and replaces L1 to give L2 coated nanoparticles. The functional chemical molecules can be any substance that is more attractive to the nanoparticles than the stabilizer. Therefore, the functional molecules can be monomeric and polymeric molecules. The functional molecules can be in functional groups, including COOR, CONR$_2$, NH$_2$, SH, and OH and, more specifically, can be in at least two functional groups represented as $H_2N—R—NH_2$, where R is a common organic or inorganic chain.

Item is the substrate and can comprise glass, quartz, ceramics, silicon, silicon oxide, carbon, etc. As discussed above, the substrate 23 is dipped into a solution containing functional molecules 21, or functional molecules 21 are spin coated onto the substrate 23. Then, the substrate 23 is optionally rinsed and dried. More specifically, an optional particle dispersion is performed using a dispersion of solvent (e.g., $H_2O$, alcohol, ether, hydrocarbon, etc.). Next, the substrate 23 is dipped into a solution containing nanoparticles 20 stabilized by the stabilizer 22. As shown, the lower surface of the nanoparticles 20 exchange the functional molecules 21 in place of the stabilizers 22 to form a first layer of nanoparticles 20 on the substrate 21. The replacement leads to a monolayer of nanoparticles 26, as shown in FIG. 2B.

Figure 2B:
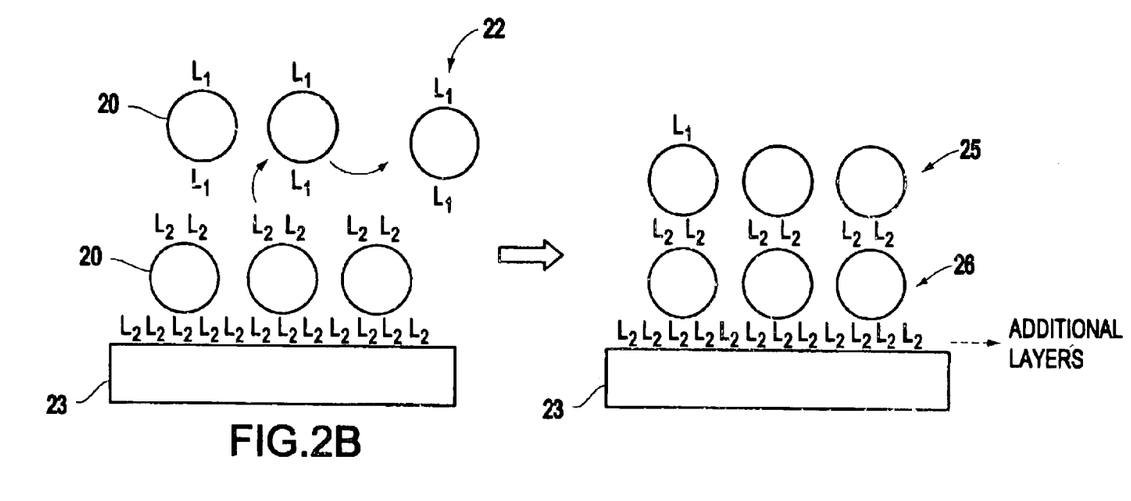

As shown in FIG. 2B, after the first layer 26 of nanoparticles is formed, the ligands 22 on top of the nanoparticles 20 are replaced with L2 ligands (21) by dipping the substrate again into the functional molecule solution (or spin coating the functional molecules thereon). Replacement of the top L1 ligands with L2 (bifunctional or multiple functional ligand) leads to an L2 based ligand layer that can be used to adhere another layer 25 of nanoparticles over the first layer 26 of nanoparticles. Repeating this process can lead to an even greater number of layers in the multilayered nanoparticle assembly.

Figure 3:
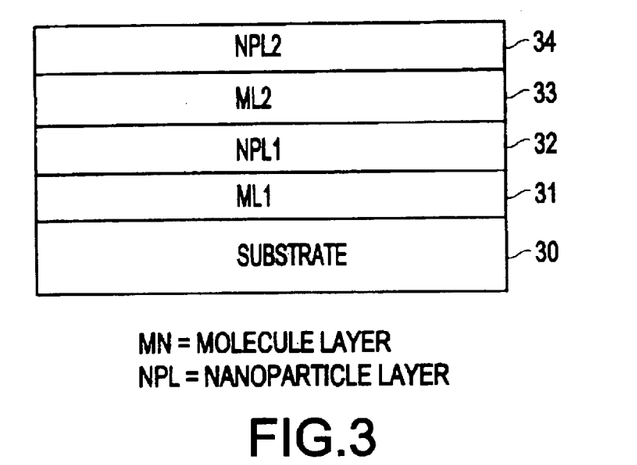
FIG. 3 is a schematic diagram showing layer-to-layer assembled nanoparticle film.

A schematic diagram of a layer-by-layer assembled nanoparticle film formed via PEI is shown in FIG. 3. Item 30 represents the substrate, items 31 and 33 represent the ligand layers, and items 32 and 34 represent the nanoparticle layers. Nanoparticle layer 1 (NPL1) 32 and nanoparticle layer 2 (NPL2) 34 can be the same nanoparticles, or they may be different. For example, if both nanoparticle layer 1 (32) and nanoparticle layer 2 (34) are FePt nanoparticles, then an FePt nanoparticle thin film is formed. If nanoparticle layer 1 (32) is cobalt nanoparticles, while nanoparticle layer 2 (34) is FePt nanoparticles, then a layered nanocomposite Co/FePt film is formed. If nanoparticle layer 1 (32) is non-magnetic nanoparticles, such as Cu or Ag nanoparticles, and nanoparticle layer 2 (34) is magnetic particles, such as Co or Fe nanoparticles, then the layered structure may be used as an Fe GMR (giant magneto-resistive) device.

Figure 4:
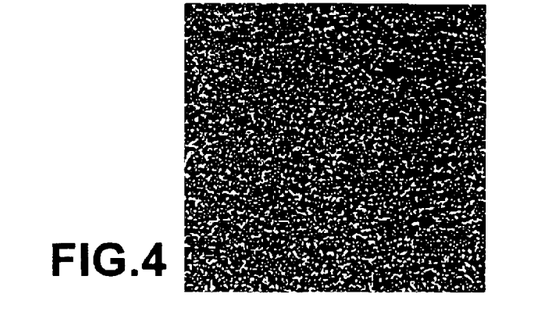
FIG. 4 is an image of one layer assembly of nanoparticles via polyethyleneimine on a silicon oxide surface.

In one embodiment, a silicon membrane was immersed into the chloroform solution of PEI for about 30 seconds, then withdrawn from the solution and dipped into ethanol solvent to wash off extra PEI on the substrate surface and dried. The functionalized substrate was immersed into the hexane dispersion of 6 nm $Fe_{50}Pt_{50}$ for 30 seconds, withdrawn from the dispersion, washed with fresh hexane and dried. FIG. 4 is a TEM image of one layer of 6 nm $Fe_{50}Pt_{50}$ nanoparticles self-assembled on a PEI-modified silicone oxide, with film composition being $SiO/PEI/Fe_{50}Pt_{50}$, produced by the previous process.

Figure 5:
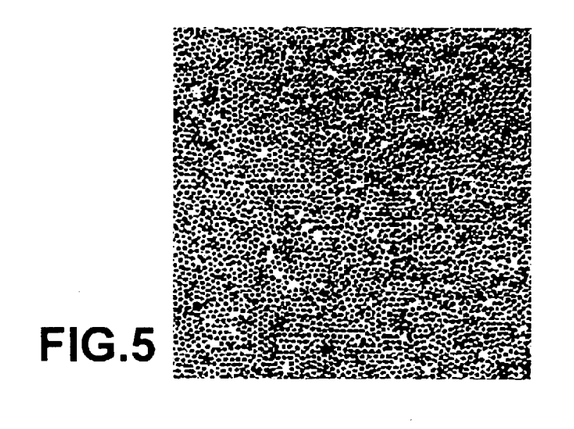
FIG. 5 is an image of one layer assembly of nanoparticles via polyvinylpyrolidone on a carbon surface.

Another example of forming one layer of Co nanoparticle assembly via PVP is described as follows. An amorphous carbon membrane was dipped into the dichloromethane solution of PVP, withdrawn from the solution and dried. The PVP modified membrane was then dipped into the hexane dispersion of 8 nm cobalt nanoparticles for 30 seconds, withdrawn from the dispersion, washed with fresh hexane and dried. FIG. 5, is the TEM image of one layer of 8 nm cobalt nanoparticles self-assembled on a PVP-modified carbon surface, with film composition being SiO/P VP/Co, produced by the previous process.

Figure 6:
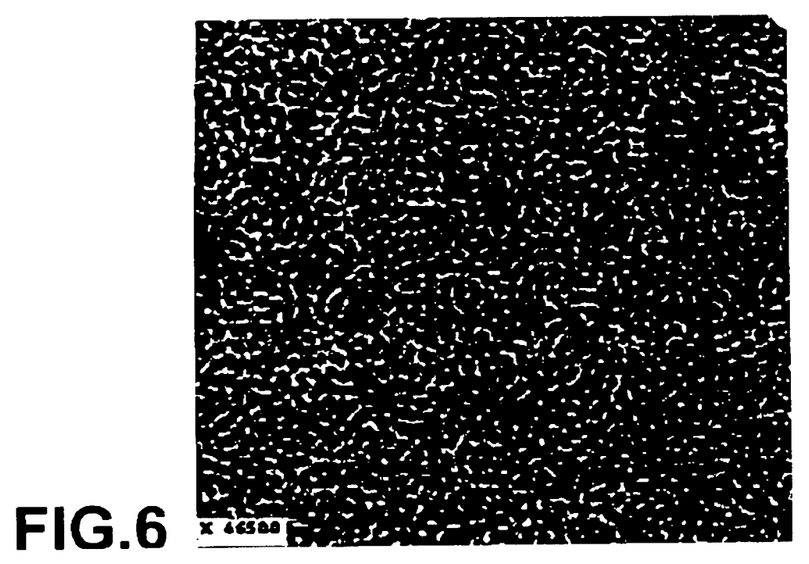
FIG. 6 is an image of a three-layer assembly of nanoparticles via PEI on a silicon oxide surface.

A third example of forming three layers of FePt nanoparticle assembly via PEI is as follows. A silicon oxide substrate was immersed into the chloroform solution of PEI for about 30 seconds, then withdrawn from the solution and dipped into ethanol solvent to wash off extra PEI on the substrate surface and dried. The PEI functionalized substrate was immersed into the hexane dispersion of 6 nm $Fe_{50}Pt_{50}$ for 30 seconds, withdrawn from the dispersion, washed with fresh hexane and dried. The coated substrate was immersed into the chloroform solution of PEI for about 30 seconds, then withdrawn from the solution, rinsed with fresh ethanol and dried. The substrate was, once again, immersed into the hexane dispersion of 6 nm $Fe_{50}Pt_{50}$ for 30 seconds, withdrawn from the dispersion, rinsed with fresh hexane and dried. By repeating the coating of PEI and FePt, the three layers of 6 nm $Fe_{50}Pt_{50}$ nanoparticle assembly was made. By repeating this inventive two-step process in a cyclic fashion, layer-by-layer assembled polymer/nanoparticle multilayer films can be obtained. FIG. 6 is the TEM image of three layers of 6 nm $Fe_{50}Pt_{50}$ nanoparticles self-assembled on a PEI-modified silicone oxide surface, produced by the previous process. The film is alternatively layered with PEI and FePt in the form of sub/PEI/FePt/PEI/FePt/PEI/FePt., FIG. 6.

Figure 7:
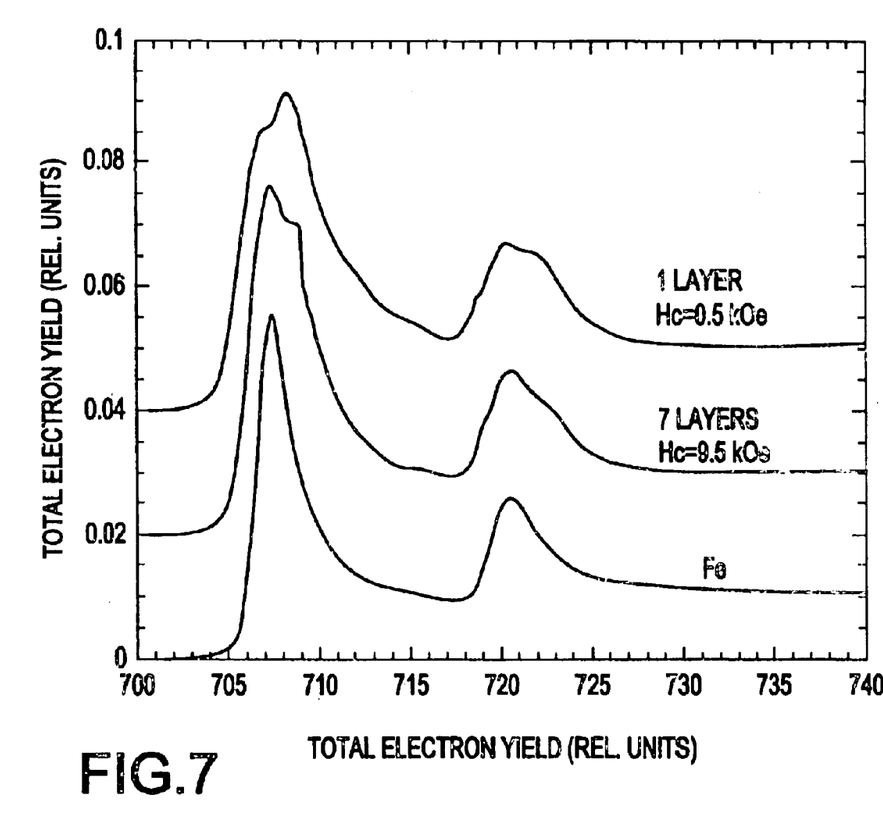
FIG. 7 shows NEXAFS spectra for one and seven layer films of 8 nm particles.

The chemical nature of the films produced with the invention was studied using near-edge X-ray absorption fine structure spectroscopy (NEXAFS) measured in total electron yield. The data indicate that all films contain a fraction of iron oxide. FIG. 7 shows as an example the NEXAFS spectra for 1 and 7 layer films of 8 nm particles annealed at 580° C. in $N_2$ for 30 min, together with a metallic Fe reference spectrum. The 7 layer film shows a much more metallic character than the 1 layer film. The best fit to the experimental data for a weighted superposition of Fe and $Fe_3O_4$ reference spectra indicates that iron/iron oxide ratio for the 1 layer assembly is 55%/45%, while for the 7 layer assembly, a 75%/25% ratio is obtained. The ratio of the spectra is not identical to the ratio of Fe and $Fe_3O_4$ in the film because of the surface sensitivity of the method. Adjustment of annealing conditions and chemistry led to a reduction of the oxidized Fe content and an increase in metallic Fe present in the ordered $L1_0$ phase. This correlates strongly with the increase of the coercivity of the film. A model assuming a metallic FePt core and an oxide shell shows that an oxide thickness of only 0.35 to 0.4 nm is sufficient to explain the observed NEXAFS spectra for samples with various particle sizes between 4 and 8 nm. The relatively large contribution of the oxide shell to the spectra is due to the geometry and the short electron escape depth.

Figure 8:
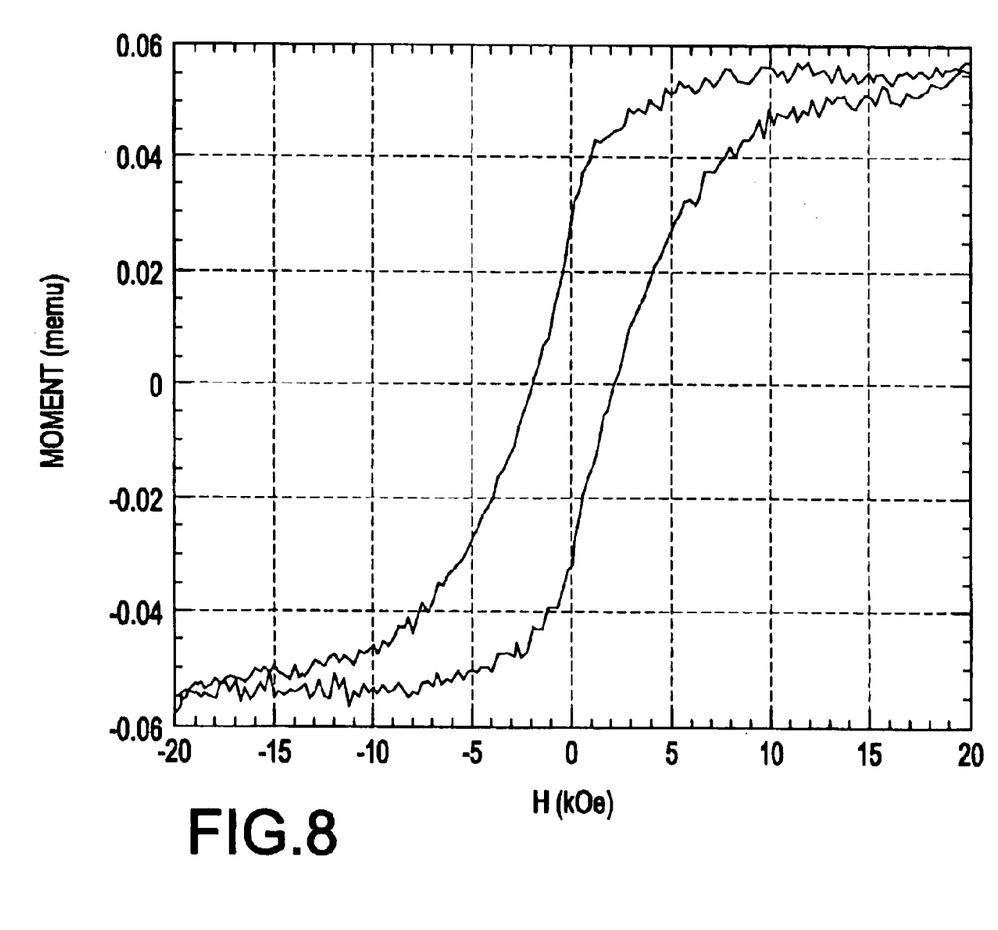
FIG. 8 is an in-plane hysteresis loop of a three layer PEI/FePt assembly measured using a superconducting quantum interference device (SQUID)

The magnetic properties of the film are controlled by thermal annealing. FIG. 8 is a (SQUID) hysteresis loop of a three layered 4 nm $Fe_{58}Pt_{42}$ nanomagnetic granular film annealed under $N_2$ for 10 min. The film has been annealed at 580° C. for 10 min under one atmospheric nitrogen environment. The coercivity of this film reaches 2400 Oe. The coercivity of the annealed films typically increases with annealing time and temperature, and a minimum temperature of about 500° C. is required to begin forming the ordered $L1_0$ phase. An increased number of layers also leads to an increase in the film coercivity. For magnetic recording, thin, high an isotropy layers of small nanoparticles are most desirable. The thinnest layers that showed coercivity greater than 300 Oe (as measured by SQUID) were 1 layer films for 8 nm particles and 2 layer films for 4 nm particles. Superconducting quantum interference device (SQUID) measurements show that coercivity as high as 17 kOe can be achieved for 3 layer/4 nm particle thin films (annealed at 800° C. for 5 min. in $N_2$). The easy axis of the particles is randomly oriented, leading to identical hysteresis loops for in-plane and perpendicular measurements and a remnant magnetization $Mr_r=0.5\ M_s$ where Ms is the saturation magnetization.

Figure 9:
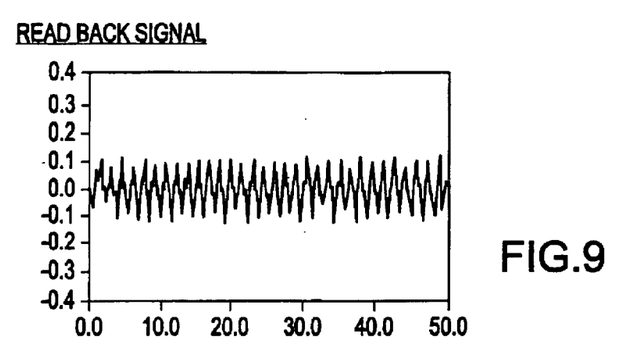
FIG. 9 is a diagram of a magneto-resistive read-back signals from written bit transitions in a thermally annealed three layer assembly of 4 nm FePt nanoparticles.

The film is magnetically hard and can support magnetization reversal transitions. FIG. 9 shows magneto-resistive (MR) read back signals from the written bit transitions in a thermally annealed three layer assembly of PEI/4 nm $Fe_5gPt_{42}$ nanoparticles. It demonstrates that a FePt nanoparticle assembly as thin as around 12 nm can still support magnetic recording.

Figure 10:
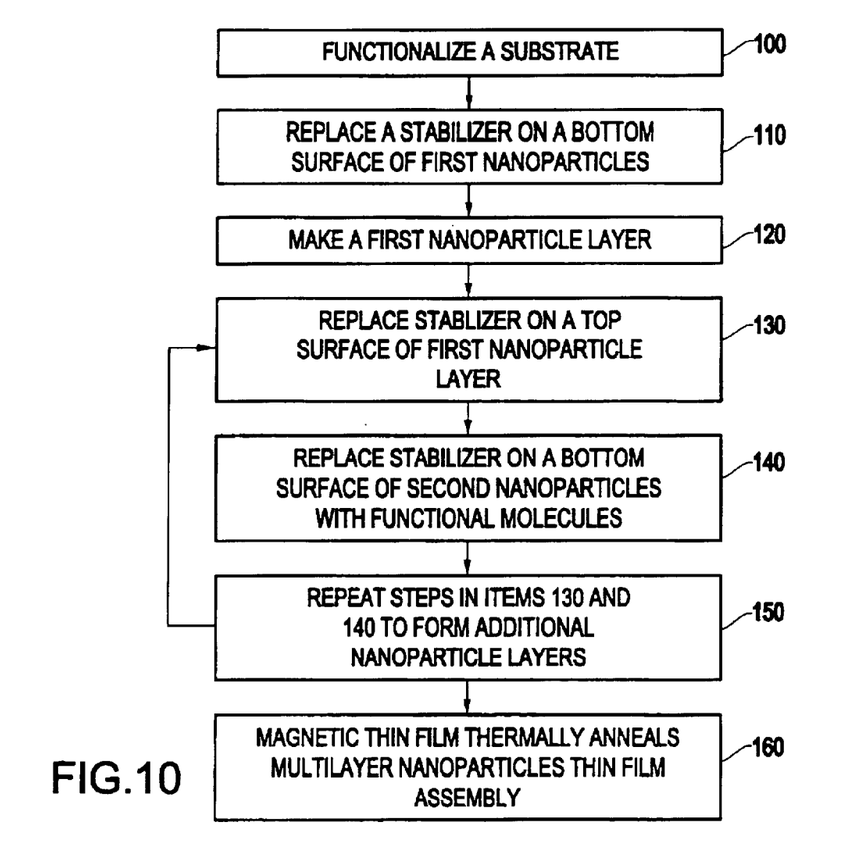
FIG. 10 is a flowchart showing the processing with the invention.

A flowchart of the processing of the invention is illustrated in FIG. 10. In item 100, the invention functionalizes a substrate. Next, in item 110, the invention replaces stabilizers on a bottom surface of the first nanoparticles. In item 120, the invention makes a first nanoparticle layer. In item 130, the invention replaces the stabilizer on a top surface of the first nanoparticle layer. In item 140, the invention replaces the stabilizer on a bottom surface of the second nanoparticle with functional molecules. Next, in item 150, the invention repeats the processing steps in items 130 and 140 to form additional nanoparticle layers. Lastly, in item 160, a magnetic thin film is made by thermally annealing the multilayer nanoparticle thin film assembly.

The inventive process involves absorption of polymeric/monomeric functional molecules on a solid substrate and replacement of the stabilizer around the nanoparticles (via ligand exchange) to make a nanoparticle assembly on the substrate. The bi/multiple functional molecules are used again to replace the stabilizer on the top surface of the nanoparticles and to replace the stabilizer of a new group of nanoparticles to form a second nanoparticle layer. The process is repeated to make a multilayered nanoparticle assembly.

The invention is especially useful for forming magnetic recording media and/or magnetic hard disks. The invention also generates a smooth nanoparticle-based film with controls on film dimension, thickness and physical properties. It is useful for forming magnetic recording media, magnetic hard disks, magnetic recording tape, and magneto optical recording media. The multilayered nanoparticle films are also important to the study and fabrication of magneto-resistive devices. The assembly of a small magnetic nanoparticle on the end of a sharp tip, such as an AFM probe, will lead to highly sensitive magnetic sensors for magnetic force sensing at high spatial resolution. The well-controlled monolayer assembly of nanoparticles on various surfaces can also be used as catalysts.

While the invention has been described in terms of preferred embodiments, those skilled in the art will recognize that the invention can be practiced with modification within the spirit and scope of the appended claims.

What is claimed is:

1. A process of forming a multilayer nanoparticle thin film assembly, said process comprising:
    (a) functionalizing a substrate with functional molecules;
    (b) replacing a stabilizer located on a bottom surface of first nanoparticles with said functional molecules via surface ligand exchange to make a first nanoparticle layer on said substrate;
    (c) replacing said stabilizer located on a top surface of said first nanoparticle layer with functional molecules via surface ligand exchange;
    (d) replacing said stabilizer located on a bottom surface of second nanoparticles with said functional molecules via surface ligand exchange to make a second nanoparticle layer on said first nanoparticle layer;
    (e) repeating steps (c) and (d) to form additional nanoparticle layers; and
    (f) thermally annealing said thin film assembly.

2. The process in claim 1, wherein said substrate comprises one of glass, quartz, ceramics, silicon, silicon oxide, and carbon.

3. The process in claim 1, wherein said substrate has a shape of one of a flat plane, a sphere, a V-type tip, an ellipsoid and a cylinder.

4. The process in claim 1, wherein said functionalization of said substrate comprises coating a layer of said functional molecules on said substrate by dipping said substrate into said molecule solution.

5. The process in claim 1, wherein said functionalization of said substrate comprises spin coating a layer of said functional molecules on said substrate.

6. The process in claim 1, wherein said functional molecules comprise one of monomeric and polymeric molecules.

7. The process in claim 1, wherein said functional molecules comprise functional groups including COOR, CONR2, NH2, SH, and OH, where R comprises an organic or inorganic chain.

8. The process in claim 1, wherein said functional molecules comprise at least two functional groups represented as H2N—R—NH2, where R comprises an organic or inorganic chain.

9. The process in claim 1, wherein said stabilizer comprises one of II2O, RCOOR1, RCONR1, RNH2, RSH, RCN, ROH, R4N+, where R and R1 represent organic chains.

10. The process in claim 1, further comprising, after said functionalizing, rinsing said substrate with solvent and drying said substrate.

11. The process in claim 1, wherein said first nanoparticles are different than said second nanoparticles.

12. A process of forming a multilayer nanoparticle thin film assembly, said process comprising:
    functionalizing a substrate with functional molecules;
    replacing a stabilizer located on a bottom surface of first nanoparticles with said functional molecules via surface ligand exchange to make a first nanoparticle layer on said substrate;
    replacing said stabilizer located on a top surface of said first nanoparticle layer with functional molecules via surface ligand exchange;
    replacing said stabilizer located on a bottom surface of second nanoparticles with said functional molecules via surface ligand exchange to make a second nanoparticle layer on said first nanoparticle layer;

repeating said process to form additional nanoparticle layers; and thermally annealing said multilayer nanoparticle thin film assembly to control physical properties of the film.

13. The process in claim 12, wherein said thermally annealing is performed under an inert atmosphere comprising one of nitrogen, argon, and helium.

14. The process in claim 12, wherein said thermally annealing is performed under a reducing atmosphere comprising one or more of a hydrogen atmosphere, nitrogen and hydrogen atmosphere, argon and hydrogen atmosphere, and helium and hydrogen atmosphere.

15. The process in claim 12, wherein said thermally annealing is performed under a reactive gas atmosphere.

16. The process in claim 15, wherein said reactive gas comprises one of air, oxygen, hydrocarbon, hydrogen sulfide, halogen and said thermally annealing forms, respectively, one of a granular metal oxide film, a metal carbide film, a metal sulfide film, and a metal haloride film.

17. A process of forming a multilayer nanoparticle assembly, said process comprising:

coating a layer of functional molecules on a substrate;

dipping said substrate in a solution containing nanoparticles to form a layer of said nanoparticles bound to said substrate by said functional molecules;

repeating said coating and said dipping to form said multilayer nanoparticle assembly;

annealing said multilayer nanoparticle assembly.

18. The process in claim 17, wherein said functional molecules displace stabilizing molecules joined to said nanoparticles in said solution.

19. The process in claim 17, wherein said coating of said functional molecules on said substrate comprises one of:

dipping said substrate into a solution containing said functional molecules and removing said substrate from said solution; and spin coating a layer of said functional molecules on said substrate.

20. The process in claim 17, further comprising, after said coating, rinsing said substrate with solvent and drying said substrate.

21. The process in claim 17, wherein said first nanoparticles are different than said second nanoparticles.

22. The process in claim 17, wherein said annealing is performed under an inert atmosphere comprising one of nitrogen, argon, and helium.

23. The process in claim 17, wherein said annealing is performed under a reducing atmosphere comprising one or more of a hydrogen atmosphere, nitrogen and hydrogen atmosphere, argon and hydrogen atmosphere, and helium and hydrogen atmosphere.

24. The process in claim 17, wherein said annealing is performed under a reactive gas atmosphere.

* * * * *